June 5, 1956  HANS-MARTIN PAPE  2,749,045

PRESSURE AND TEMPERATURE OPERATED STEAM TRAP

Filed May 5, 1951

INVENTOR
HANS-MARTIN PAPE
BY Richards Geier
ATTORNEYS

United States Patent Office 2,749,045
Patented June 5, 1956

2,749,045
PRESSURE AND TEMPERATURE OPERATED STEAM TRAP

Hans-Martin Pape, Bremen, Germany, assignor to Gustav F. Gerdts, Bremen, Germany Application May 5, 1951, Serial No. 224,852

1 Claim. (Cl. 236—59)

This invention relates to a thermostat for actuating regulating devices and valves for use in steam and water circuits and the like.

An object of the present invention is to eliminate drawbacks of prior art steam and water circuits which require that the pressure under which they must operate must be set precisely at the time of the operation.

Another object is the provision of a thermostat which will eliminate continuous steam losses present in prior art constructions.

Other objects of the present invention will appear more clearly in the course of the following specification.

In attaining the objects of the present invention it was found desirable to provide a regulating valve which in addition to the prior art thermostats is operated by a device the effect of which depends on the operating pressure in such manner that for each pressure the opening and closing of the apparatus take place in the vicinity of the boiling point of the liquid which is being furthered.

The invention will appear more clearly from the following more detailed description when taken in connection with the accompanying drawings showing by way of example preferred embodiments of the inventive idea.

Figure 1:
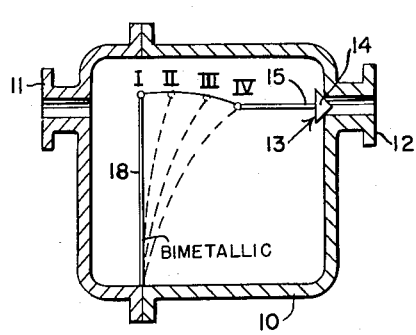
Figure 1 is a diagrammatic section through a prior art conduit and valve.

Figure 1 shows a water conduit having a casing 10 provided with an inlet pipe 11 and an outlet pipe 12. The valve 13 has a valve body 14 which is connected by a rod 15 with a thermostat 18 which in the example illustrated consists of a bimetallic strip attached at one end to the member 15 and attached to the casing 10 at the other end.

Since this apparatus must conduct water and not steam, the valve 13 must be moved to the closed position shown in the drawings when water is heated close to its boiling temperature. On the other hand, as soon as the water has cooled somewhat through being accumulated next to the closed valve, the valve 13 must open again. It is apparent, however, that the boiling temperatures of the same liquid vary to a great extent depending upon pressure prevailing in the conduits.

Let it be assumed that the prior art device shown in Figure 1 has been designed to close at a pressure $p_1$. Shortly before the fluid has reached the boiling point corresponding to that pressure the thermostat 18 has moved into the position IV indicated by dotted lines in Figure 1. Then the valve 13 is closed. According to regulations the valve 13 must open somewhat when the temperature has dropped a little and the thermostat 18 has moved to a position III indicated by broken lines in Figure 1. When the pressure drops now to $p_2$ the thermostat 18 will reach only the position II at the time the liquid has reached its boiling point. The result is that the valve 13 will not be closed and steam will escape through the outlet 12 until pressure has increased again to $p_1$.

Furthermore, if the member 15 is not yieldable, the thermostat 18 will be prevented from moving further after the valve 13 is closed, with the result that the thermostat 18 often breaks, bends or deviates from its required position.

This drawback of prior art constructions is eliminated in accordance with the present invention by devices illustrated in Figures 2 to 6.

Figure 2:
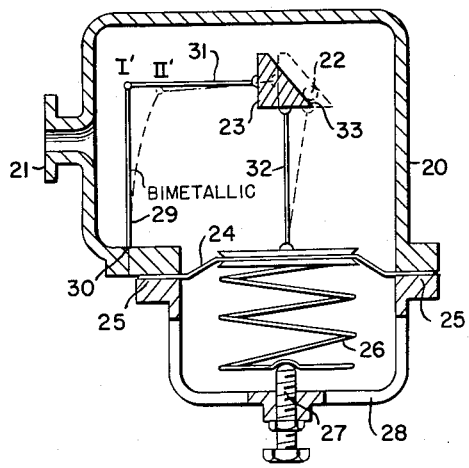
Figure 2 shows in section a device constructed in accordance with the principles of the present invention.
Figure 3:
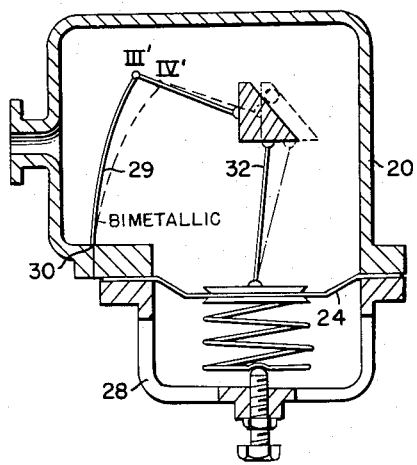
Figure 3 is similar to Figure 2 and shows the various parts of the device in a different position.

The device shown in Figures 2 and 3 includes a casing 20 having an inlet 21. The outlet 22 is located in this case at right angles to the inlet 21 and may be closed or opened by a valve having the form of a slide 23 which can be moved transversely to the outlet 22.

A diaphragm 24 or other suitable steering device is actuated depending upon the prevailing pressure. The diaphragm 24 is held at 25 in the casing 20 and is engaged by spring 26 the other end of which is engaged by a pressure screw 27 which is carried by an extension 28 of the casing 20. Due to the action of the spring 26 the diaphragm 24 is bent somewhat in the direction toward the opening 24, the extent of the bending being dependent upon the pressure prevailing in the casing 20. The action of the spring 26 may be adjusted in the usual manner by means of the screw 27.

A thermostat 29 is located within the casing 20 and is attached to the casing at 30. The opposite end of the thermostat 29 is connected by a connecting member 31 with the slide 23.

It is apparent that the slide 23 is shifted by the thermostat 29 in one direction for the purpose of closing or opening the outlet. On the other hand, the slide 23 is also moved in a direction perpendicular or practically perpendicular to the direction produced by the thermostat 29, by means of the diaphragm 24 which is connected with the slide 23 by a connecting member 32.

As shown in the drawings, the slide 23 has an inclined edge 33 which is adapted to move over the outlet 22. The edge 33 extends obliquely to the directions of both movements.

The operation of the device is readily apparent by comparing Figures 2 and 3. Figure 2 shows the position of the parts corresponding to a lower operational pressure $p_2$ so that the diaphragm 24 is bent inwardly to a substantial extent. As shown in Figure 2, the slide 23 will open the outlet 22 in the position $I^1$ of the thermostat 29 while the opening 22 will be closed in the position $II^1$ of the thermostat 29. Figure 3 shows the parts at a time when high pressure $p_1$ is prevailing within the device. Then the diaphragm 24 will be urged outwardly as indicated in Figure 3. The opening 22 will be open in the position $III^1$ and will be closed in the position $IV^1$.

Figure 4:
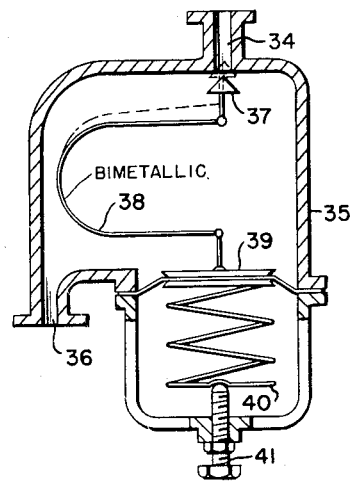
Figure 4 shows in section a device of a somewhat different form.

Another example is illustrated in Figure 4. In this construction the outlet 34 of the casing 35 is located above and to one side of the inlet 36. The outlet 34 is closed and opened by a valve 37 located within the casing 35 and serving as a regulating and closing device.

A bimetallic strip 38 is U-shaped and is connected with one end to the valve 37. The lower end of the thermostat 38 is connected with a diaphragm 39 the position of which is affected by pressure prevailing within the casing 35. The diaphragm 39 is engaged by a spring 40 which is set by means of a set screw 41.

It is apparent that when the spring 40 is set to the correct pressure, the thermostat 38 in the case of low pressure will be bent inwardly to a great extent and will open and close the valve 37 in positions corresponding to positions I and II of the device shown in Figure 1. On the other hand, at higher temperatures when the thermostat 38 is bent to a greater extent the operation of the valve 37 will also be correct since the lower end of the thermostat 38 will be shifted outwardly to a corresponding amount in view of the higher pressure and the consequent shifting of the diaphragm 39.

Figure 5:
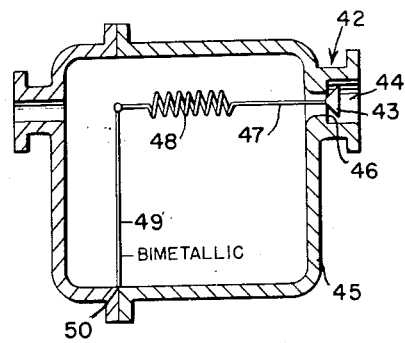
Figure 5 illustrates in section a water conduit provided with a thermostat.
Figure 6:
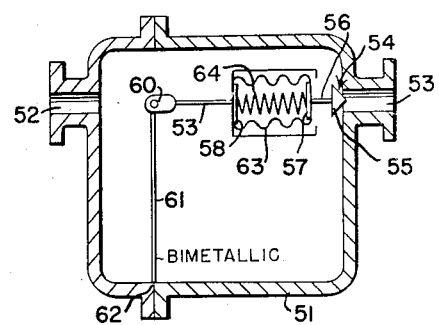
Figure 6 shows in section a somewhat differently constructed device.

The devices shown in Figures 5 and 6 comprise means varying the effects of length between a valve and a thermostat depending upon the prevailing pressure.

In the construction shown in Figure 5 the valve 42 has a valve body 43 which is located within the outlet 44 of a casing 45. In this construction the closing movement of the valve body 43 toward the valve seat 46 is opposed to the flow of the fluid out of the outlet 44. Thus it is apparent that the pressure prevailing within the casing 45 tends to open the valve 42. The valve body 43 is connected by a rod 47 with a helical spring 48 the other end of which is connected to the outer end of a bimetallic strip constituting the thermostat 49. The opposite end of the strip 49 is attached at 50 to the casing 45.

In the described construction the helical spring 48 is subjected to a pulling force. It is apparent that a spring may be replaced by other known resilient means the length of which extends with the increase in pressure.

By suitably dimensioning the spring 48 the position of the member 47 can be changed, depending upon the prevailing pressure, in such manner that the opening and closing of the valve 42 will always take place close to the boiling point of the liquid which flows out of the casing 45. A further advantage is that there are no parts which would prevent the bending of the bimetallic strip 49 after the closing of the valve 42 when the temperature has continued to rise. This is attained due to the provision of the spring 48. Therefore this construction eliminates excessive strains upon the bimetallic strip 49 and an excessive bending of the strip which results in incorrect operation.

In the described construction the force of the spring 48 and the pressure upon the valve body 43 operate against each other so that the valve 42 is operable to close the casing 45 only when pressure is comparatively low.

A considerably higher limit of closing pressure can be attained by the construction shown in Figure 6 which includes a casing 51, an inlet 52, and an outlet 53 located opposite each other. In this construction the valve 54 includes a valve body 55 which is moved outwardly in the direction of the flow of the liquid to close the valve. The valve body 55 is connected by a valve stem 56 with a plate 57. Another plate 58 is located opposite the plate 57 and is attached to a connecting rod 59. A member 60 connects the rod 59 with a bimetallic strip 61 which is attached at 62 to the casing. The plates 57 and 58 are joined by an expansible and contractible device which may consist of bellows 63. A spring 64 is located between the plates 57 and 58 within the bellows 63.

When the valve body 55 is moved to the closing position, the operative connection between the valve body 55 and the thermostat 61 is interrupted.

The area of the plates 57 and 58 which is subjected to pressure is preferably larger than the cross-sectional area of the outlet 53.

It is apparent that the bellows 63 may be conveniently replaced by other suitable means, for example by two diaphragms.

The spring 64 located within the bellows 63 has the tendency to push the two plates 57 and 58 away from each other.

The operation of the device is as follows:

As the pressure increases within the casing 51, the spring 64 will be compressed and then the distance between the valve body 55 and the thermostat 61 will be shorter. It is apparent that by suitably dimensioning the spring 64 and the plates 57 and 58, the operative distance between the valve 54 and the thermostat 61 can be shortened to such an extent for each pressure that the opening and the closing of the valve 54 will always take place close to the boiling point of the liquid flowing through the outlet 53.

Since the plates 57 and 58 are larger in cross-section than the cross-section of the outflow passage 53, the adjustment of the operative length of the valve-thermostat connection has little effect upon the pressure exerted upon the valve body 55.

An outer casing 65 encloses the bellows 63 and is provided with inturned flanges serving as stops which limit the length of the valve-thermostat connection. Due to this arrangement this connection will not become excessively long as a result of frictional resistances when pressure within the casing 51 is low or is non-existent.

The link 60 may be provided with an opening which will permit it to shift longitudinally. This becomes important in the event the valve 54 is closed and the temperature continues to rise. The thermostat 61 then continues to be bent and would have to overcome the force of the spring 64 which is quite large in view of the large size of the plates 57 and 58. In order to avoid excessive bending of the thermostat 61, the opening provided in the link 60 makes it possible for the top end of the thermostat 61 to move somewhat in the direction toward the valve body 55 after the valve body has been moved already to its closed position.

It is apparent that the examples shown above have been given solely by way of illustration and not by way of limitation and that they are subject to many variations and modifications within the scope of the present invention. All such variations and modifications are to be included within the scope of the present invention.

What is claimed is:

A steam trap, comprising a casing having an inlet and an outlet located opposite said inlet and in alignment therewith, whereby steam and hot water may flow through said casing from said inlet to said outlet, a helical spring located within said casing and having inner and outer ends and a longitudinal axis substantially in alignment with said inlet and outlet, whereby variation in pressure of the medium flowing through and around said helical spring causes a variation of the operative length thereof by contracting or expanding the helical spring, said outlet having a valve seat located outside said casing, a valve body located outside said casing and movable toward and away from said casing to engage and disengage said valve seat, a rod extending through said outlet and having one end connected with said valve body and the other end connected with the outer end of said helical spring, and a bi-metallic thermostat located within said casing substantially in the flow of said medium and directly engaged by said medium, said thermostat extending substantially transversely to said rod and spring and having one end connected with the inner end of said helical spring and another end attached to an inner wall of said casing.

References Cited in the file of this patent

UNITED STATES PATENTS

| | | |
|---|---|---|
| 1,755,964 | Morris | Apr. 22, 1930 |
| 1,890,531 | Schurtz | Dec. 13, 1932 |
| 1,916,696 | Stewart | July 4, 1933 |
| 2,033,398 | Rogers | Mar. 10, 1936 |
| 2,092,497 | Breese | Sept. 7, 1937 |

FOREIGN PATENTS

| | | |
|---|---|---|
| 10,607 | Great Britain | 1907 |
| 64,018 | Sweden | May 4, 1925 |
| 200,787 | Switzerland | Oct. 31, 1938 |